(12) United States Patent
Inoue

(10) Patent No.: US 7,721,974 B2
(45) Date of Patent: May 25, 2010

(54) THERMOSTAT DEVICE

(75) Inventor: Fujio Inoue, Tokyo (JP)

(73) Assignee: Nippon Thermostat Co., Ltd, Kiyose-shi (JP)

( * ) Notice: Subject to any disclaimer, the term of this patent is extended or adjusted under 35 U.S.C. 154(b) by 1177 days.

(21) Appl. No.: 10/563,429

(22) PCT Filed: May 17, 2005

(86) PCT No.: PCT/JP2005/008956

§ 371 (c)(1),
(2), (4) Date: Jan. 5, 2006

(87) PCT Pub. No.: WO2005/113958

PCT Pub. Date: Dec. 1, 2005

(65) Prior Publication Data

US 2006/0163373 A1 Jul. 27, 2006

(30) Foreign Application Priority Data

May 21, 2004 (JP) .............................. 2004-151128

(51) Int. Cl.
*G05D 23/02* (2006.01)
*G05D 23/13* (2006.01)
(52) U.S. Cl. ............... 236/101 C; 236/93 A; 123/41.08
(58) Field of Classification Search ............... 236/93 A, 236/93 R, 101 C; 123/41.08; 137/468
See application file for complete search history.

(56) References Cited

U.S. PATENT DOCUMENTS 2,514,803 A * 7/1950 Schultz ........................ 236/34

FOREIGN PATENT DOCUMENTS

| JP | 60 65215 | 4/1985 |
| JP | 50125 1990 | 4/1990 |
| JP | 38474 1991 | 4/1991 |
| JP | 80176 1991 | 8/1991 |
| SU | 769040 B * | 1/1980 |

* cited by examiner

*Primary Examiner*—Chen-Wen Jiang
(74) *Attorney, Agent, or Firm*—Oblon, Spivak, McClelland, Maier & Neustadt, L.L.P.

(57) ABSTRACT

A thermostat device includes a valve housing with a cooling water passage of an internal combustion engine, a built-in thermally expansive body thermally expanded or contracted by temperature change of cooling water, a piston rod slid by thermal expansion/contraction of the expansive body, and a valve body subjected to opening/closing operation by the piston rod in accordance with volume change of the expansive body. A valve seat shape on downstream side than the valve seat, which is an internal wall face forming the passage is formed in a shape that in valve open condition the cross-sectional area of the passage between an inlet seal of the valve seat and the top face of the valve body gradually decreases with reference to the maximum passage cross-sectional area on upstream side and that the cross-sectional area of the passage at the face perpendicular to the top face gradually increases.

9 Claims, 9 Drawing Sheets

THERMOSTAT DEVICE

TECHNICAL FIELD

The present invention relates to a thermostat device which is a temperature sensing type automatic valve employed for control of cooling water temperature by switching the flow of engine cooling water by operating in response to temperature change of the cooling water, in a cooling water circuit of an internal combustion engine (hereinbelow called an engine) whereby cooling water that cools an engine employed in, for example, an automobile is circulated through a heat exchanger (hereinbelow referred to as a radiator), and in particular relates to a housing type thermostat device in which the main body of a thermoelement, valve body or the like is incorporated in a valve housing provided with a cooling water inlet.

BACKGROUND ART

In automobile engines, in order to cool these, typically a cooling system of the water-cooling type using a radiator is employed. Conventionally, in a cooling system of this type, a thermostat or the like, employing a thermally expansive body whereby the flow rate of cooling water circulated to the radiator was adjusted, was employed in order to control the temperature of the cooling water that was introduced into the engine.

Specifically, a control valve such as a thermostat employing a thermally expansive body as described above is inserted in part of the cooling water passage, such as for example at the inlet or outlet of the engine, and, if the cooling water temperature is low, this control valve is closed so that the cooling water is circulated through a bypass passage without passing through the radiator and, if the cooling water temperature is high, the control valve is opened, so that the cooling water is circulated through the radiator: in this way, the temperature of the engine cooling water can be controlled to a desired condition.

In a conventional thermostat device of this type, there are provided a thermoelement in which is sealed a thermally expansive body that is operated in response to temperature change of the fluid and a main body frame that holds this; first and second valve bodies that respectively present substantially umbrella shapes are provided at both ends of the thermoelement. This thermoelement comprises a rod that is advanced and retracted by means of an expanding/contracting thermally expansive body that is used to sense the temperature of the fluid and is arranged such that the aforesaid valve body opens/closes a fluid passage in a manner that is linked to the movement of this rod (see for example patent reference 1).

[Patent reference 1] Japanese Patent No. 3225386

DISCLOSURE OF THE INVENTION

However, since the conventional thermostat device of this type has a construction wherein a valve seat that seats a first valve body is provided in a part of the main body frame, the construction being such that the entire device is arranged incorporated in the fluid passage, the number of structural components is large and the construction is complicated; in addition, many portions of this device presented resistance to the fluid flow, increasing the resistance to passage of water and resulting in considerable loss of pressure, so there were problems in achieving the required control of flow rate.

A thermostat device has therefore been proposed of the integrated housing type, using a housing wherein a fluid passage is formed, with the aim of for example reducing the number of components, by incorporating a main body section comprising a thermoelement and/or valve body etc in the interior thereof. With such an integrated housing type thermostat device, few components face the interior of the fluid passage and few locations present obstacles to the fluid flow, so it has been found that the loss of pressure can be reduced to a certain extent.

However, even with an integrated housing type of thermostat device of this type, when the flow of fluid is studied it is found that the water flow delamination phenomenon occurs at various locations, resulting in loss of inflow energy, so that, as a result, pressure losses in the thermostat section are increased. This is therefore associated with the drawback that, from this point of view, appropriate flow rate control cannot be achieved: devisal of some countermeasure whereby such problems of pressure loss can be completely eliminated is therefore desired.

This invention was made in view of the above circumstances, and an overall analysis including an analysis of the flow of fluid such as to make it possible to reduce pressure losses of the fluid in a thermostat device of the integrated housing type was conducted, an object thereof being to obtain a thermostat device whereby the required flow rate characteristic for the thermostat can be obtained by reducing pressure losses within the valve housing.

In order to achieve this object, a thermostat device according to an embodiment of the present invention which is incorporated within a valve housing provided with a cooling water passage that constitutes a cooling water channel of an internal combustion engine, which has a built-in thermally expansive body that is thermally expanded or contracted by change of temperature of the cooling water, and which comprises a piston rod that is slid by thermal expansion/contraction of this thermally expansive body, wherein a valve body is subjected to opening/closing operation with respect to a valve seat formed within the valve housing by sliding of the piston rod in accordance with change of volume of the thermally expansive body, is characterized in that the valve seat shape further on the downstream side in the direction of flow of the cooling water than the valve seat where the valve body is seated, which is an internal wall face forming a cooling water passage within the valve housing, is formed in a shape such that, in the valve open condition, the cross-sectional area of the passage that is formed between the inlet seal of the valve seat on which the valve body is seated and the top face of the valve body gradually decreases on the cooling water inlet side with reference to the maximum passage cross-sectional area on the upstream side in the direction of flow of the cooling water, and such that the [cross-sectional] area of the passage at the face perpendicular to the top face gradually increases on the cooling water outlet side so that cooling water flows along the top face of the valve body.

A thermostat device according to another embodiment of the present invention is characterized in that the valve housing comprises a plurality of support legs that support a thermoelement in which the thermally expansive body is sealed, and cooling water passages (for example grooves) are formed in some of these support legs along the direction of flow of the cooling water.

A thermostat device according to yet another embodiment of the present invention is characterized in that, in the thermostat device, there is provided a frame member that supports a thermoelement in which the thermally expansive body is sealed, and a hole for passage of cooling water is formed in the bottom face of this frame member.

A thermostat device according to still another embodiment of the present invention is characterized in that, in the thermostat device a taper-shaped section is formed that forms a tapered face such that the central section thereof is elevated around the periphery of a thermoelement at the top face of the valve body.

As described above, with a thermostat device according to the present invention, by optimizing the shape of the valve seat that is further on the downstream side in the direction of flow of the cooling water than the valve seat constituted by the internal wall face forming a cooling water passage within the valve housing, pressure loss can be diminished and the flow of cooling water can thereby be optimized, making it possible to ensure the required flow rate characteristic of a thermostat device.

In particular, according to the present invention, pressure loss at the valve or valve body due to the valve seat on which this is seated is diminished, and pressure loss around the thermoelement is diminished, so flow rate control at the valve can be optimally performed and its function as a thermostat can be exhibited.

It has been confirmed by analysis and experiment that, with a thermostat device according to the present invention as described above, pressure loss can be diminished to the extent of about 40 to 60%, compared with a thermostat device of conventional construction. Also, since pressure loss can be diminished in this way, the advantage is obtained that a thermostat device whereby an equivalent flow rate characteristic is obtained can be reduced in size and weight.

Furthermore, according to the present invention, thanks to the provision of a tapered section whose central section is elevated at the top face of the valve body, the flow of cooling water in the required direction can be rectified. In particular, if the flow of cooling water is rectified by providing such a tapered section, a smooth flow of cooling water to the aperture of the valve is obtained and delamination of the water flow can be reduced, so pressure loss can be diminished and the flow rate characteristic improved.

DESCRIPTION OF THE PREFERRED EMBODIMENTS

FIG. 1 to FIG. 4 show an embodiment of a thermostat device according to the present invention.

In these Figures, in a cooling system of for example an automobile engine, the thermostat device, which is a temperature sensing type automatic valve indicated by the reference symbol 10 is attached at the intersection of a cooling water channel on the radiator side and a bypass passage from the engine outlet side, and is employed for controlling the temperature of the cooling water reaching the engine inlet by selectively switching the flow of cooling water in the first and second fluid flow paths constituted by these passages.

Figure 1:
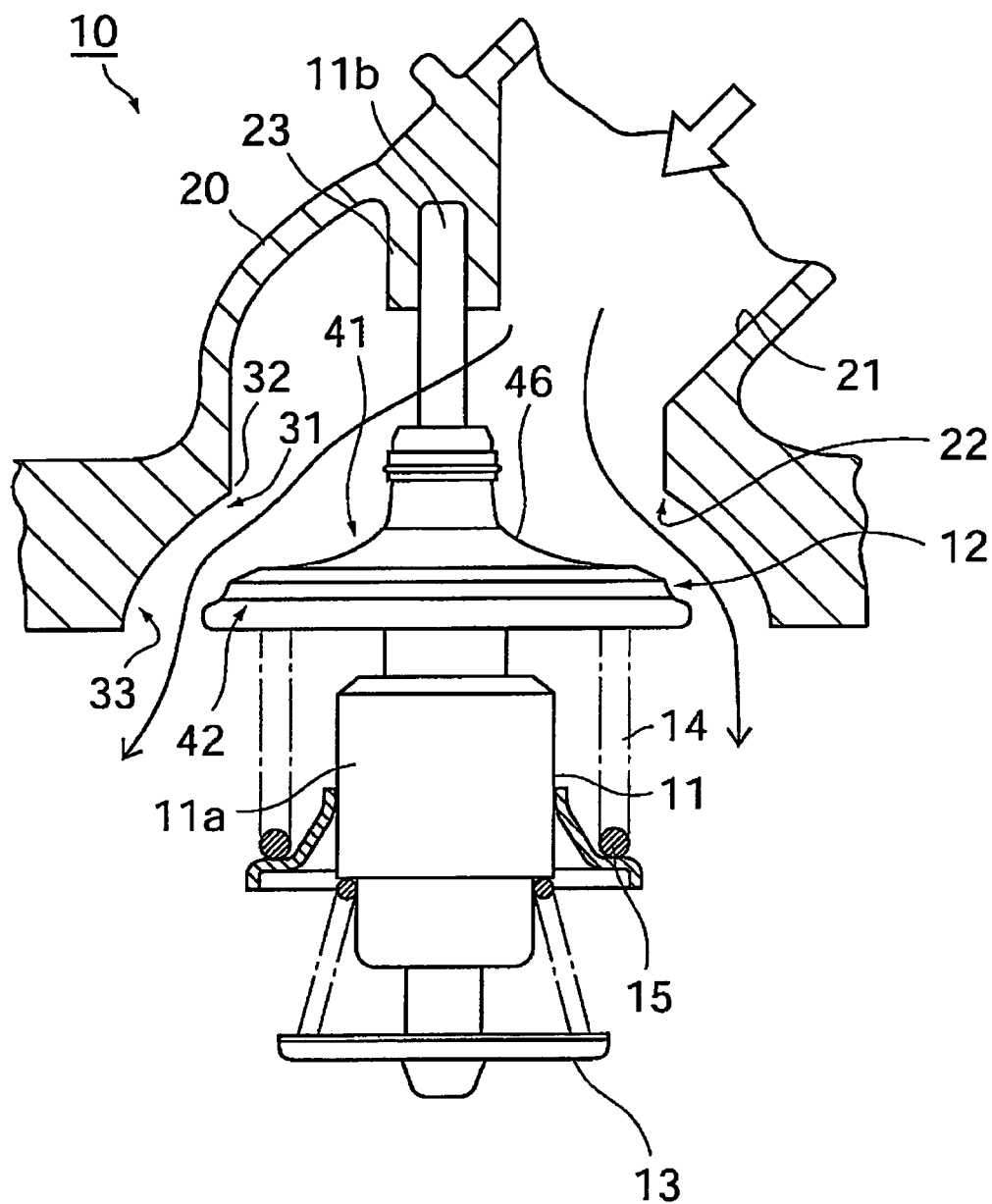
FIG. 1 is a detail cross-sectional diagram during valve opening given in explanation of the overall construction of the thermostat device as a whole, showing an embodiment of a thermostat device according to the present invention.
Figure 2:
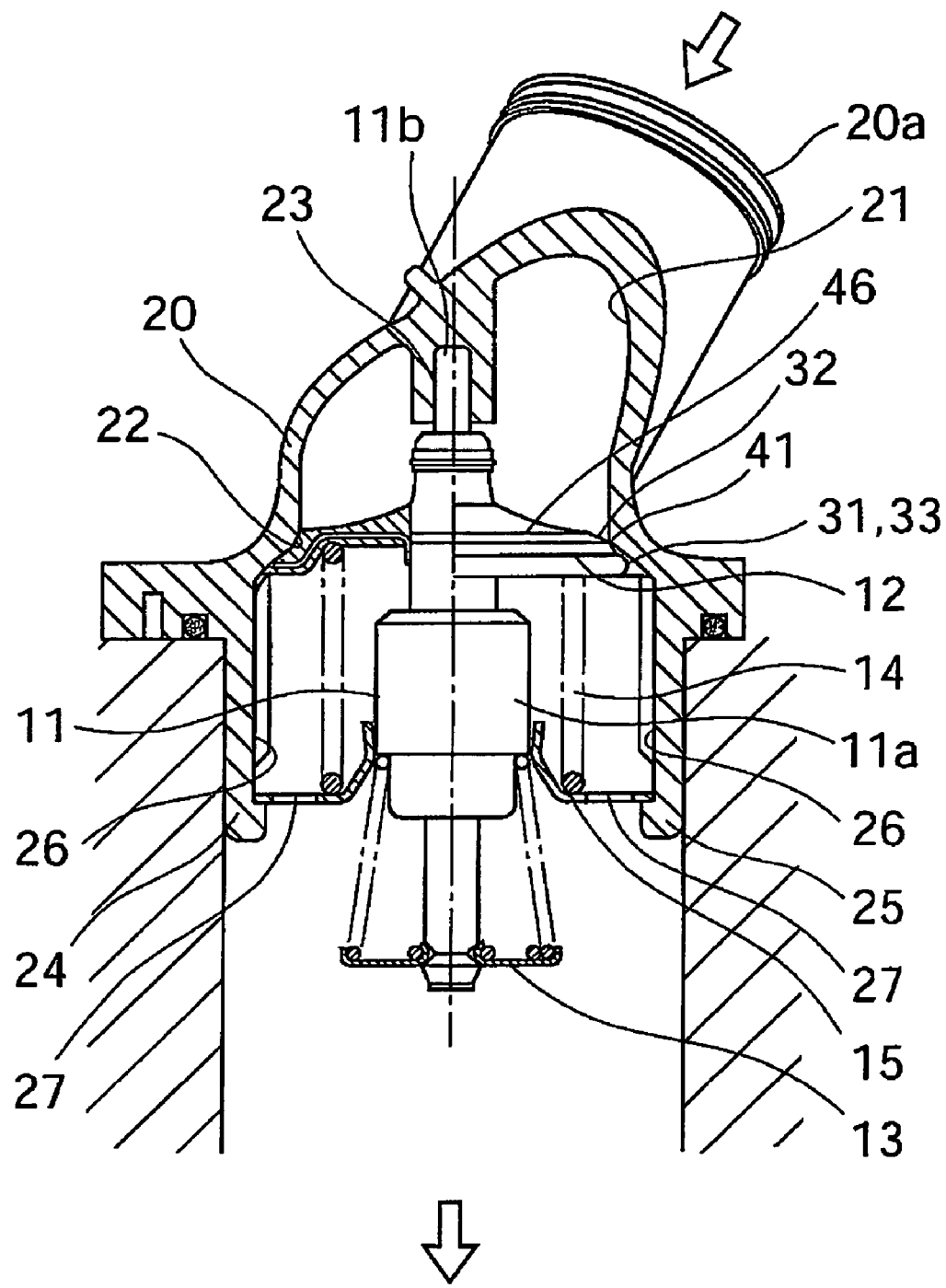
FIG. 2 is a diagrammatic cross-sectional view during valve closure showing the thermostat device of FIG. 1.

As shown in FIG. 1 and FIG. 2, the thermostat device 10 comprises a thermoelement 11 which is the working body that is operated by a temperature change of the fluid: at one end (upper side in the Figure) of this thermoelement 11, there is provided a first valve body 12 that presents a substantially umbrella shape and at the other end (lower side in the Figure) there is provided a second valve body 13. Also, in the middle in the axial direction of the thermoelement 11, there are fitted a coil spring 14 constituting biasing means that biases the first valve body 12 to a valve closing position and a main body frame 15 that also serves as a retainer of this spring. This main body frame 15 is a member that constantly biases the first valve body 12 in the valve-closing direction through the coil spring 14 and that freely slidably holds this thermoelement 11, by engagement with the support legs on the side of the valve housing, constituting fixed sections, to be described.

The thermoelement 11 comprises a temperature sensing section 11a in which is sealed a thermally expansive body such as wax that expands and contracts on sensing the temperature of the fluid; a piston 11b projects from the tip (upper end) of this temperature sensing section 11a in such a way that it is free to protrude or retract.

20 in the Figure is a valve housing comprising a passage inlet 20a for cooling water constituting a fluid inlet; within this valve housing 20, there is formed a cooling water passage 21 constituting a fluid passage, and a valve seat 22 facing the first valve body 12 in such a way that this first valve body 12 can be seated thereon is formed within a flange-shaped portion provided in part thereof. Thus, members such as the thermoelement 11 and/or main body frame 15 are incorporated in a condition in which the valve body 12 can be seated on this valve seat 22.

23 in the Figures is an engagement section that engages and holds the tip of the piston rod 11b; in the condition of FIG. 2, valve opening is produced by movement of the thermoelement 11 and the first and second valve bodies 12 and 13 downwards in FIG. 2 when the piston rod 11b projects upwards in FIG. 2 due to thermal expansion of the thermally expansive body: the condition of FIG. 1 is thereby produced.

Figure 3:
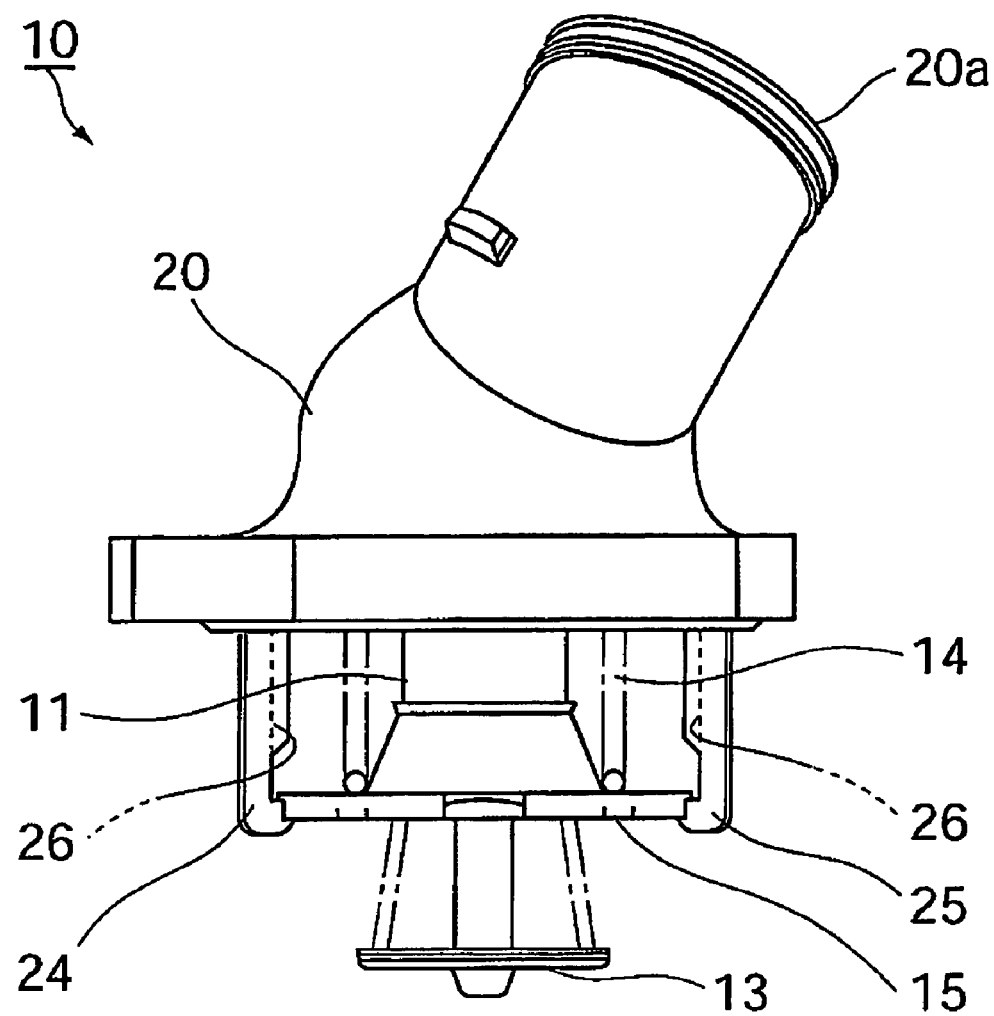
FIG. 3 is a front view of the thermostat device of FIG. 1 and FIG. 2.
Figure 4:
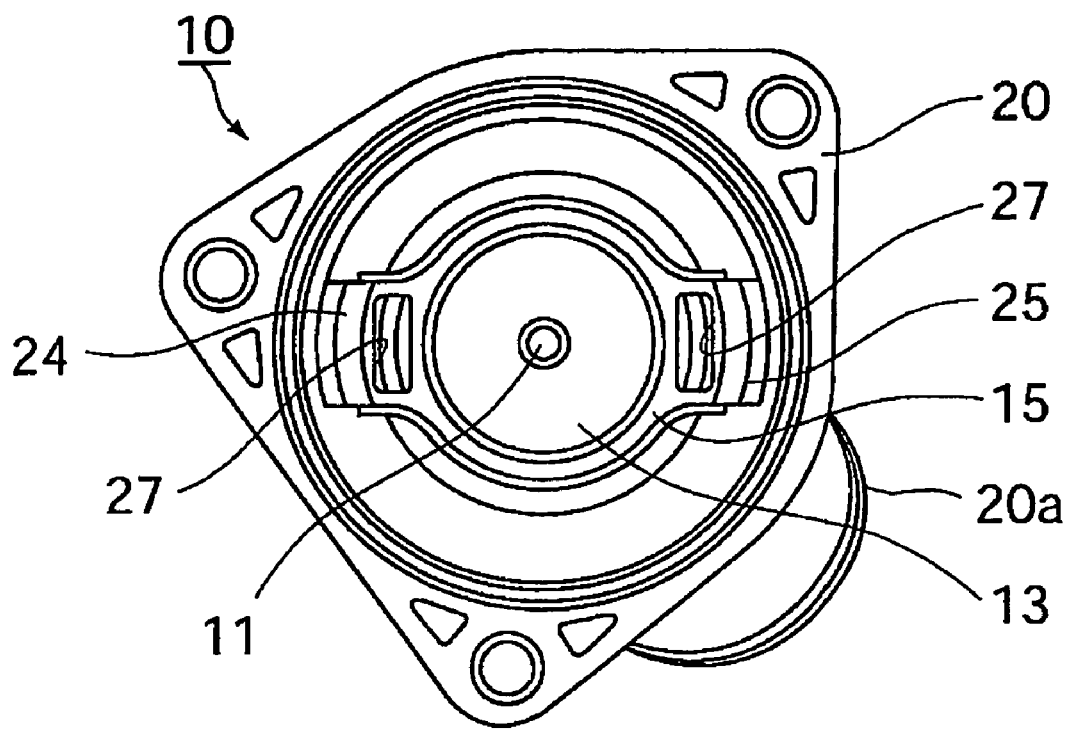
FIG. 4 is a bottom face view of the thermostat device of FIG. 3.
Figure 5:
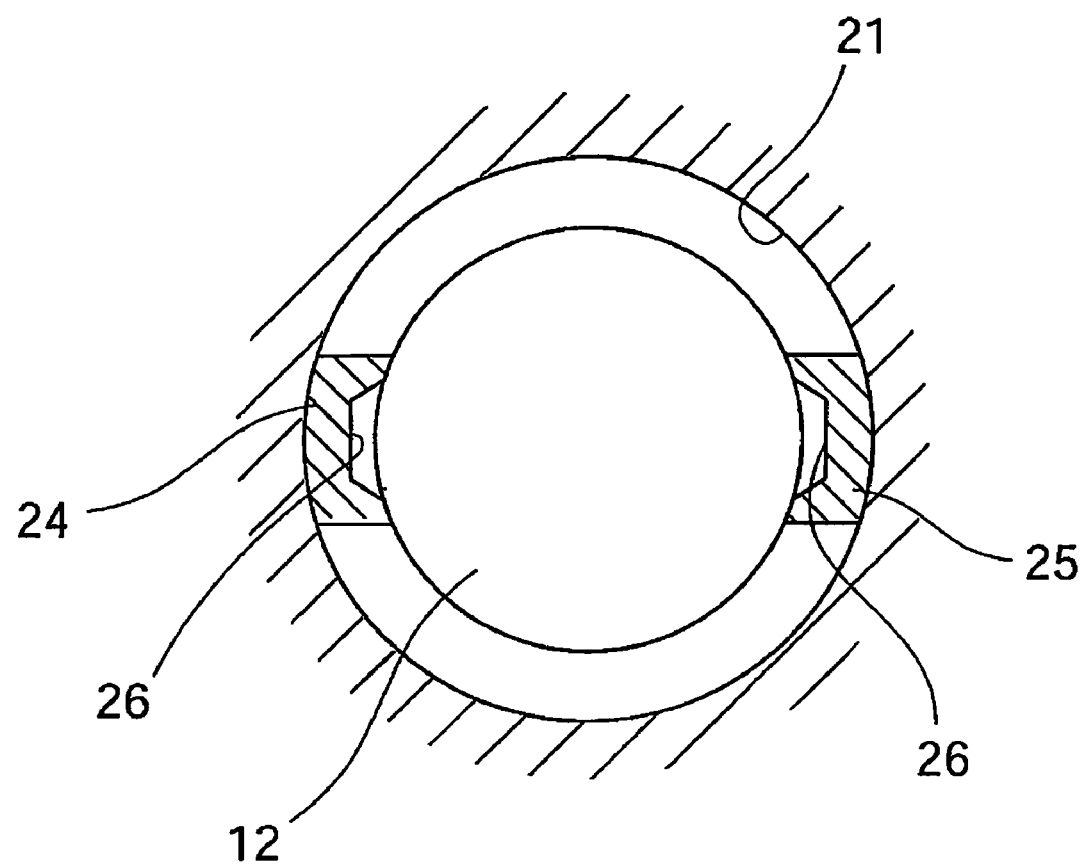
FIG. 5 is a view given in explanation of the condition of formation of grooves by a reduction of thickness towards the support legs of the valve housing.
Figure 6:
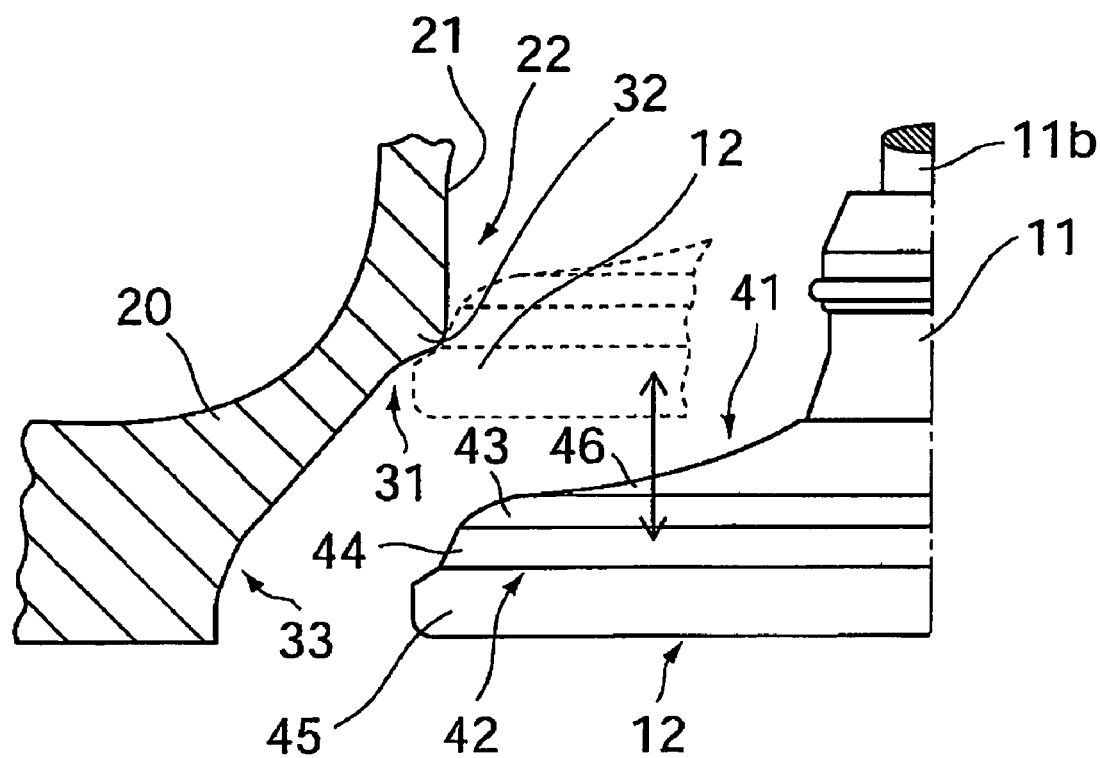
FIG. 6 is a view showing to a larger scale the relationship between the valve body and valve seat.

As shown in FIG. 2, FIG. 3 and FIG. 4, two radially extending portions of the main body frame 15 are engaged and held at the tip of the support legs 24, 25 formed extending in the axial direction on the valve housing 20. As shown in FIG. 2 to 4 and, in addition, in FIG. 5, grooves 26 constituting cooling water passages are formed by reduction of thickness along the direction of flow of the cooling water at part of the inner periphery of these support legs. These grooves 26 serve for keeping adverse effects on the flow of cooling water due to the presence of these support legs 24, 25 to the minimum when the gap between the valve seat 22 and valve body 12 is small during valve opening and in particular in the case where the valve is only opened slightly. When such grooves 26 are formed along the axial direction, cooling water flows smoothly through these grooves 26 and a current of rapid flow speed flows along the periphery of the thermoelement 11, so the advantage is also obtained that temperature-sensing performance is improved.

It may be remarked that, instead of grooves 26 produced by reduction of thickness, the interiors of the supporting legs 24, 25 could of course be formed hollow and cooling water passages could be formed along the direction of flow of the cooling water.

Also, as shown in FIG. 2 and FIG. 4, holes 27 for passage of cooling water could be formed in part of the main body frame 15. These holes 27 enable a current of rapid flow speed flowing through the grooves 26 constituting the cooling water passage referred to above to escape smoothly without obstruction by the main body frame 15. Also, in this way, even in the region of the main body frame 15, a suitable flow of cooling water is obtained, thereby improving the temperature sensing performance of the thermoelement 11.

According to the present invention, the valve seat shape further on the downstream side in the direction of flow of the cooling water than the valve seat 22 where the first valve body 12 is seated, which is an internal wall face forming a cooling water passage 21 within the valve housing 20, is characterized in that it is formed in a shape such that, in the valve open condition, the cross-sectional area of the passage formed between the inlet seal 32 of the valve seat 22 and the top face 41 of the valve body 12 gradually decreases on the cooling water inlet 31 side with reference to the maximum passage cross-sectional area on the upstream side in the flow direction of the cooling water, and such that [the cross-sectional] area of the passage at the face perpendicular to the top face 41 gradually increases on the cooling water outlet 33 side so that cooling water flows along the top face 41 of the valve body 12; the passage cross-sectional area between the cooling water inlet 31 and cooling water outlet 33 being formed so as to gradually change in accordance with the shape from the top face 41 of the valve body 12 to the seat face 42 thereof.

In the above, it is necessary that the valve body 12 and valve seat 22 described above should cut off flow of cooling water by achieving a reliable sealing condition on valve closure. For this purpose, in this embodiment, a valve seat 22 is provided at a corner of a tapered face on the inlet side in the valve housing 20, so that, by seating the valve body 12 thereon, a high face pressure can be ensured and, as a result, sealing properties can be guaranteed without needing to greatly increase the passage resistance and, since the valve shape is uncomplicated, a smooth flow of cooling water can be obtained.

Also, a function that is sometimes desired for the thermostat device 10 is to be able to suitably control the cooling water temperature. In order to achieve this, it is necessary to suitably control the flow rate of cooling water during valve opening so as to produce a condition of valve opening corresponding to the cooling water temperature: a valve seat shape as described in detail below may be adopted for this purpose.

Figure 7:
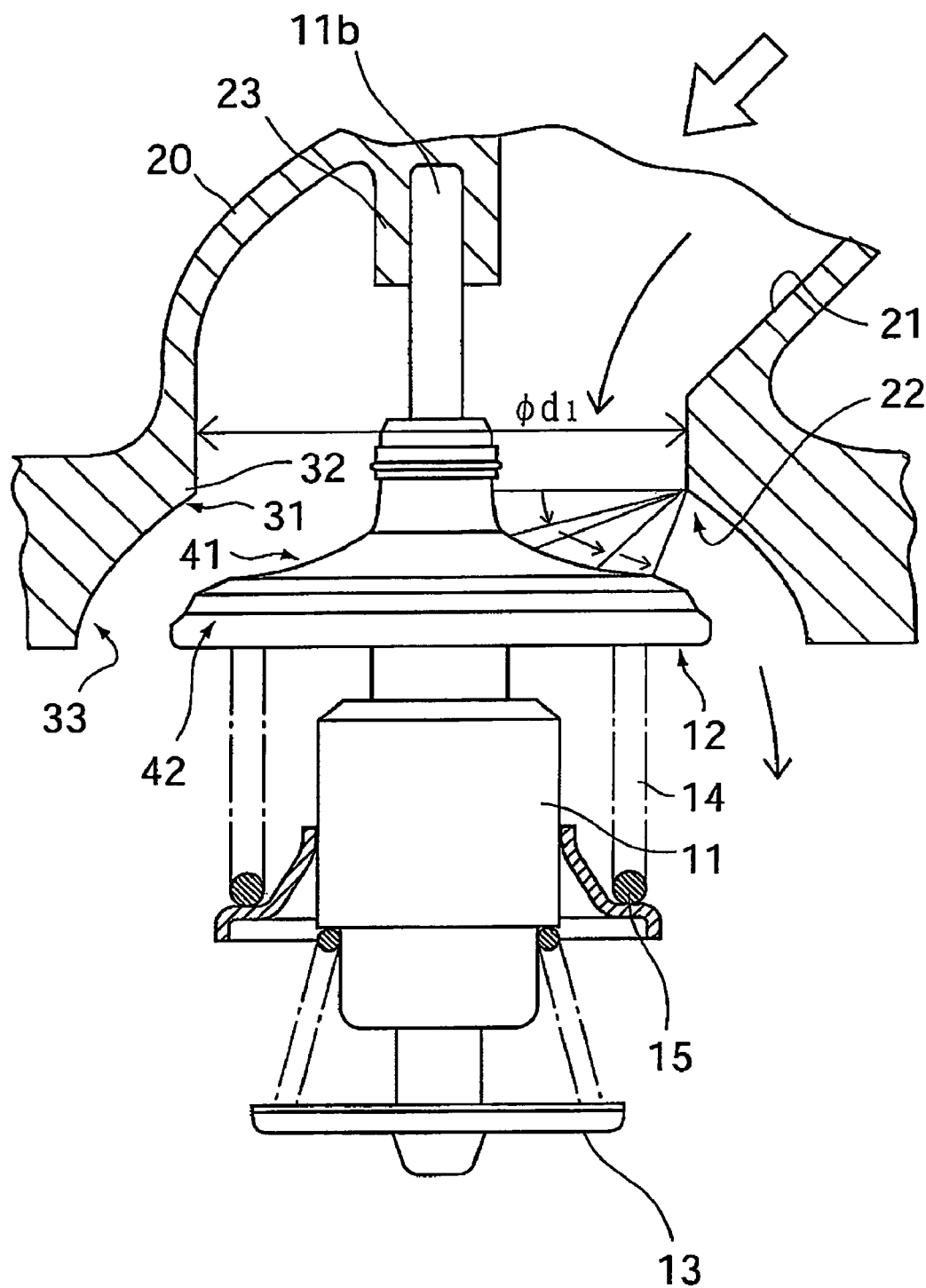
FIG. 7 is a view given in explanation of the shape of the cooling water inlet side of the valve seat.
Figure 8:
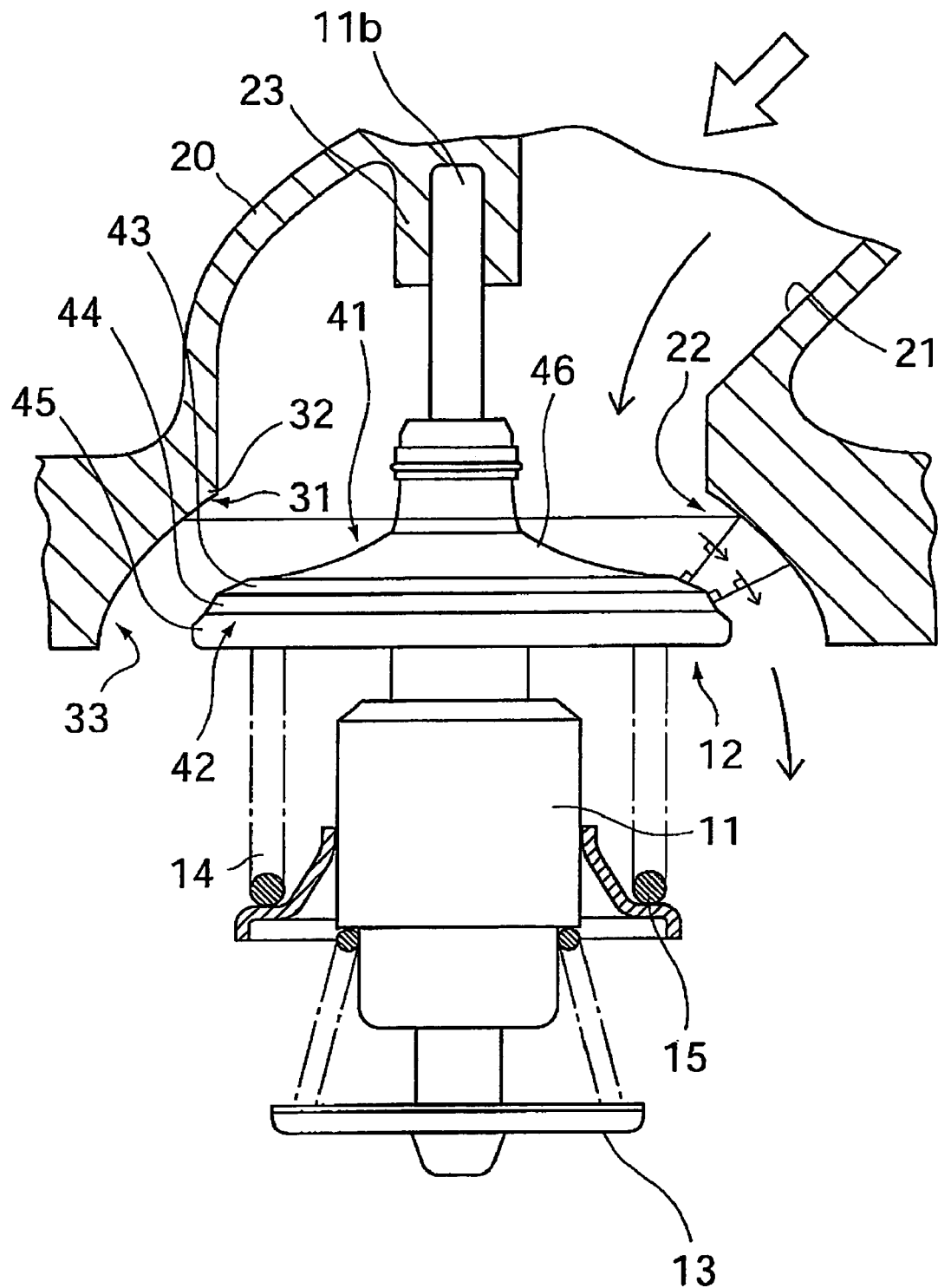
FIG. 8 is a view given in explanation of the shape of the cooling water outlet side of the valve seat.

Specifically, the cooling water flowing in from the passage inlet 20a of the valve housing 20 is throttled in the region where the inlet seal 32 constituting the valve seat 22 and the tip of the valve body 12 join, so the passage cross-sectional area becomes abruptly smaller in the case of a conventional valve shape, giving rise to the phenomenon of decrease of flow speed at the corner of the thermoelement and valve. Accordingly, as shown in FIG. 7, the side of the cooling water inlet 31 that is shaped as a valve seat is formed so as to gradually decrease in cross-sectional area from the section θd1, which is of the maximum cross-sectional area, thereby suppressing the diminution in flow speed. In other words, the cooling water inlet is designed so as to become smaller at intervals of a prescribed angle, for example 30°, keeping a distance of fixed area ratio based on the maximum passage cross-sectional area on the upstream side of the valve. Usually, in the case of water piping, it is considered that there is no loss other than frictional loss if, when the piping diameter is reduced, change takes place at no more than 30°.

In contrast, in the valve section on the side of the cooling water outlet 33, while the water flow was throttled at the tip of the valve body 12 and the inlet seal 32 of the valve seat 22, the phenomenon of delamination of the water flow is suppressed by gradually increasing the passage cross-sectional area towards the outlet side of the housing (downwards in the Figure), thereby decreasing pressure loss. It is usually said that, in water piping, when the piping diameter is increased, the loss coefficient is small so long as the change takes place at an angle of no more than 10°. Accordingly, on the side of the cooling water outlet 33 of the valve section, the shape is made such that the change in passage cross-sectional area in the valve section represents a change in cross-sectional area of the piping representing an increase corresponding to a prescribed angle, for example 10°, with reference to the outlet of the water passage.

Since the cooling water flow takes place along the surface of the valve body 12, the passage cross-sectional area of the surface perpendicular to the valve body 12 changes.

Figure 9:
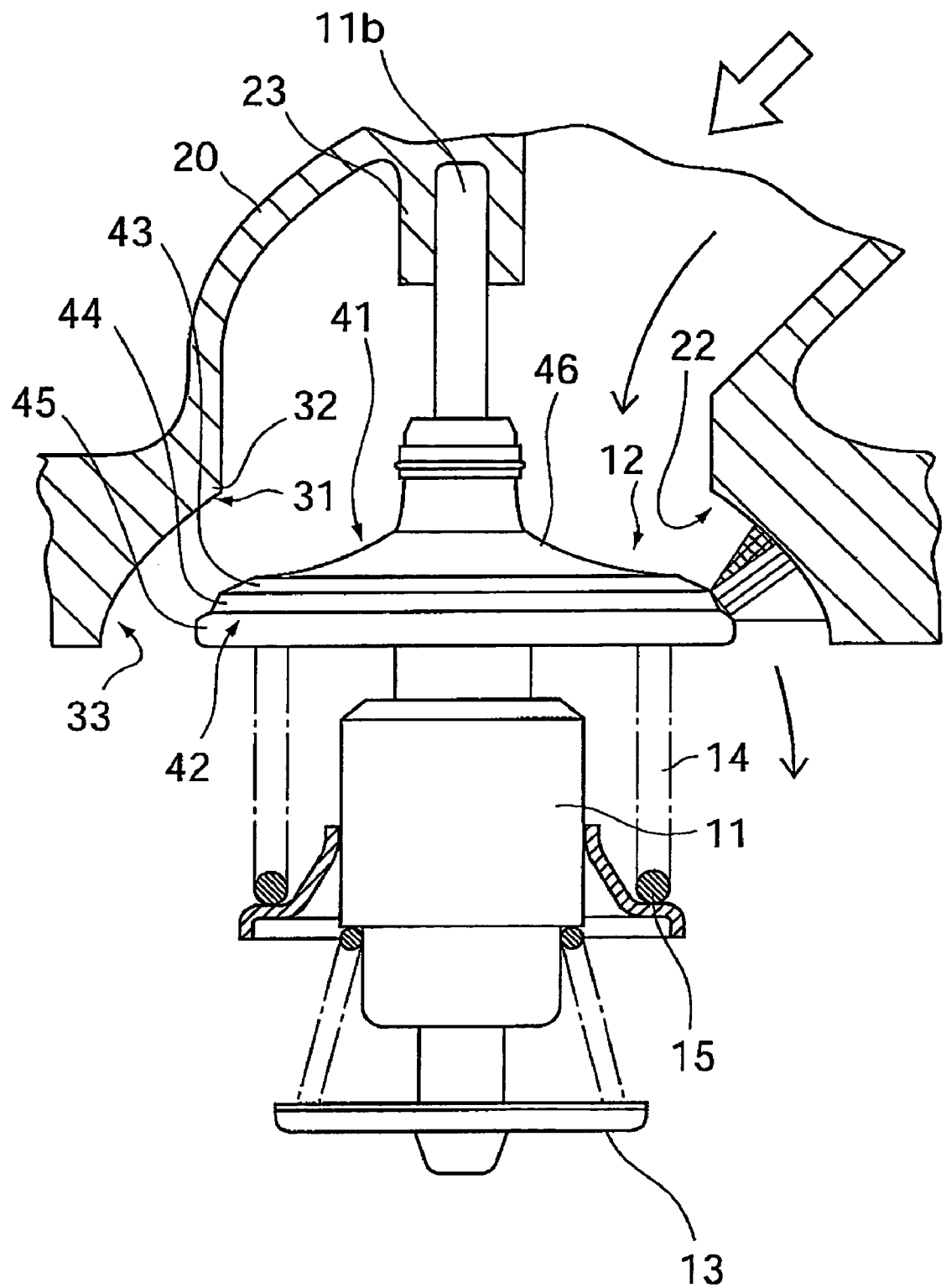
FIG. 9 is a view given in explanation of the intermediate shape of the valve seat.

Accordingly, in this embodiment, the seat face 42 of the valve body 12 is formed by first, second and third tapered faces 43, 44, 45. Although the valve seat of the valve housing 20 is formed as described above corresponding to such a valve body 12, care is taken that the cross-sectional area (portion indicated by cross hatching in FIG. 9) should be unchanged, in order that the shape should not become complex, by avoiding minute change in area at the corner, at a location corresponding to the join of the first and second tapered faces 43, 44.

Also, although the second tapered face 44 and third tapered face 45 are linked by recessing, such recessing need not be taken into account since it has little effect on the flow and the passage cross-sectional area is selected assuming straight lines joined at the tangent.

Also, in this embodiment, a taper-shaped section 46 that forms a tapered face such as to present an elevation in the middle is formed around the thermoelement 11 at the top face 41 of the valve body 12. This taper-shaped section 46 can rectify the flow of cooling water in the required direction. In particular, if the flow of cooling water is rectified by providing such an taper-shaped section 46, a smooth flow of cooling water towards the valve aperture is obtained and the passage resistance resulting from the delamination phenomenon of the water current can be diminished, so the pressure loss can be diminished and the flow rate characteristic can be improved.

It should be noted that the present invention is not restricted to the construction described in the above embodiments and the shape and construction and the like of the various sections constituting the thermostat device 10 can of course be suitably modified or altered.

For example, although, in the embodiment described above, the case was described in which the taper-shaped section 46 was integral or integrally provided on the top face 41 of the valve body 12, the present invention is not restricted to this and can still be applied with benefit, even if such a taper-shaped section 46 is absent.

Also, in the above embodiment, the case was described in which the thermostat device 10 was incorporated in an engine cooling water circuit on the inlet side of the engine, but the present invention is not restricted to this and a like beneficial effect could of course be obtained even if the thermostat device 10 were incorporated on the outlet side of the engine.

The invention claimed is:

1. A thermostat device comprising:
   a valve housing provided with a cooling water passage that constitutes a cooling water channel of an internal combustion engine;
   a built-in thermally expansive body that is thermally expanded or contracted by change of temperature of the cooling water;
   a piston rod that is slid by thermal expansion/contraction of the thermally expansive body; and
   a valve body which is subjected to opening/closing operation with respect to a valve seat formed within said valve housing by sliding of said piston rod in accordance with change of volume of said thermally expansive body,
   wherein a valve seat shape further on the downstream side in the direction of flow of the cooling water than the valve seat where said valve body is seated, which is an internal wall face forming the cooling water passage within said valve housing, is formed in a shape such that, in the valve open condition, the cross-sectional area of the passage that is formed between an inlet seal of the valve seat on which said valve body is seated and a top face of the valve body gradually decreases on the cooling water inlet side with reference to the maximum passage cross-sectional area on the upstream side in the direction of flow of the cooling water, and such that the cross-sectional area of the passage at the face perpendicular to the top face gradually increases on the cooling water outlet side so that cooling water flows along the top face of said valve body.

2. The thermostat device according to claim 1, wherein said valve housing comprises a plurality of support legs that support a thermoelement in which said thermally expansive body is sealed, and cooling water passages are formed in some of these support legs along the direction of flow of the cooling water.

3. The thermostat device according to claim 2, further comprising a frame member that supports a thermoelement in which said thermally expansive body is sealed, wherein a hole for passage of cooling water is formed in the bottom face of this frame member.

4. The thermostat device according to claim 2, wherein, at the top face of said valve body, a taper-shaped section is formed that forms a tapered face such that the central section thereof is elevated around the periphery of a thermoelement.

5. The thermostat device according to claim 1, further comprising a frame member that supports a thermoelement in which said thermally expansive body is sealed, wherein a hole for passage of cooling water is formed in the bottom face of this frame member.

6. The thermostat device according to claim 5, wherein, at the top face of said valve body, a taper-shaped section is formed that forms a tapered face such that the central section thereof is elevated around the periphery of a thermoelement.

7. The thermostat device according to claim 1, wherein, at the top face of said valve body, a taper-shaped section is formed that forms a tapered face such that the central section thereof is elevated around the periphery of a thermoelement.

8. A thermostat device comprising:
   a valve housing having a cooling water passage of an internal combustion engine and a valve seat formed in the cooling water passage, the valve seat having an inlet seal;
   a thermally expansive body which thermally expands and contracts by temperature change;
   a piston rod configured to slide by change in a volume of the thermally expansive body; and
   a valve body configured to open and close the cooling water passage by moving with respect to the valve seat of said valve housing when said piston rod slides in accordance with change of the volume of said thermally expansive body, the valve body being configured to seat on the inlet seal of the valve seat,
   wherein said valve housing has an internal wall face forming a portion of the cooling water passage further on a downstream side of the valve seat, and the internal wall face is configured such that in a valve open condition, the inlet seal of the valve seat and a top face of the valve body form a cross-sectional area of the portion of the cooling water passage which gradually decreases from a maximum passage cross-sectional area on an upstream side of the valve seat and that a face perpendicular to the top face of the valve body forms a cross-sectional area of the portion of the cooling water passage which gradually increases.

9. A thermostat device comprising:
   a valve housing having a cooling water passage of an internal combustion engine and a valve seat formed in the cooling water passage, the valve seat having an inlet seal;
   a thermally expansive body which thermally expands and contracts by temperature change;
   a piston rod configured to slide by change in a volume of the thermally expansive body; and
   a valve body configured to open and close the cooling water passage by moving with respect to the valve seat of said valve housing when said piston rod slides in accordance with change of the volume of said thermally expansive body, the valve body being configured to seat on the inlet seal of the valve seat,
   wherein said valve housing has an internal wall face forming a portion of the cooling water passage further on a downstream side of the valve seat, and the internal wall face is configured such that in a valve open condition, the inlet seal of the valve seat and a top face of the valve body form a cross-sectional area of the portion of the cooling water passage which gradually decreases from a maximum passage cross-sectional area on an upstream side of the valve seat.

* * * * *